Jan. 14, 1941.  C. H. FRY  2,228,992
METHOD OF PRODUCING BEADED ARTICLES FROM LIQUID LATEX
Filed Feb. 17, 1939  2 Sheets-Sheet 1

INVENTOR
Charles H. Fry
BY
Arthur C. Brown
ATTORNEY

Jan. 14, 1941.  C. H. FRY  2,228,992
METHOD OF PRODUCING BEADED ARTICLES FROM LIQUID LATEX
Filed Feb. 17, 1939  2 Sheets-Sheet 2
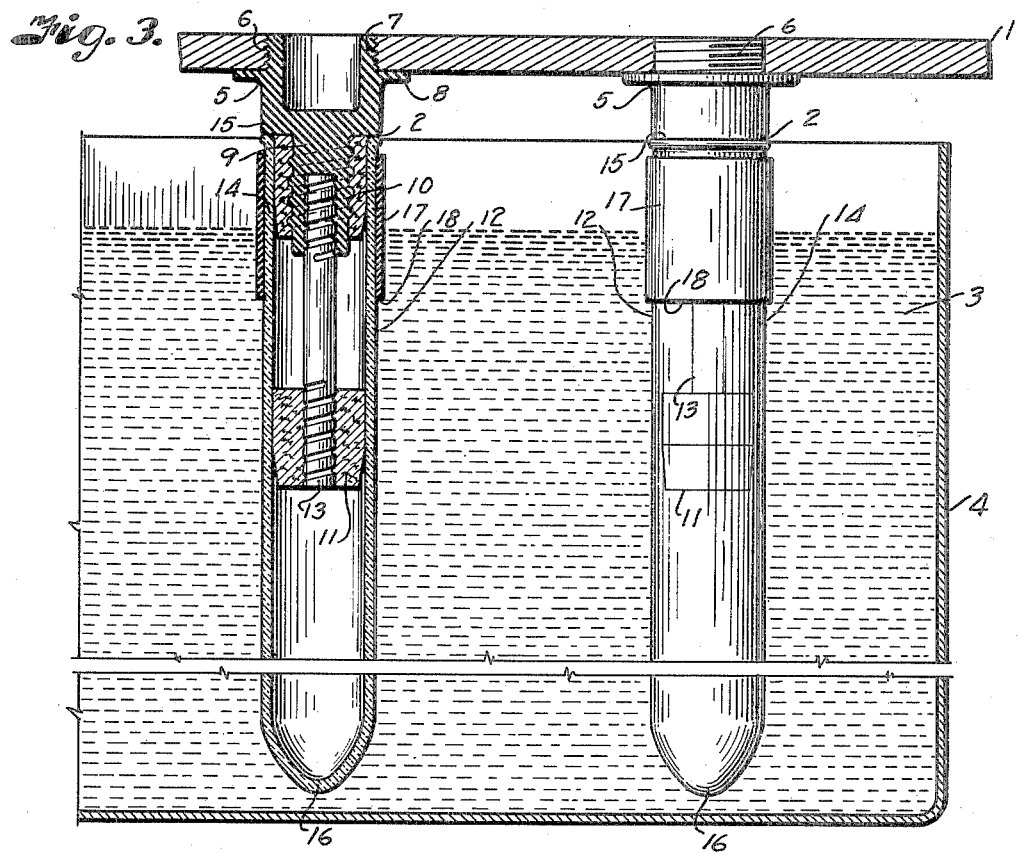
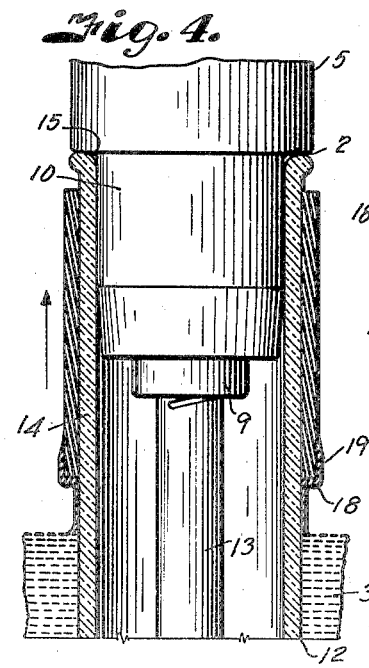
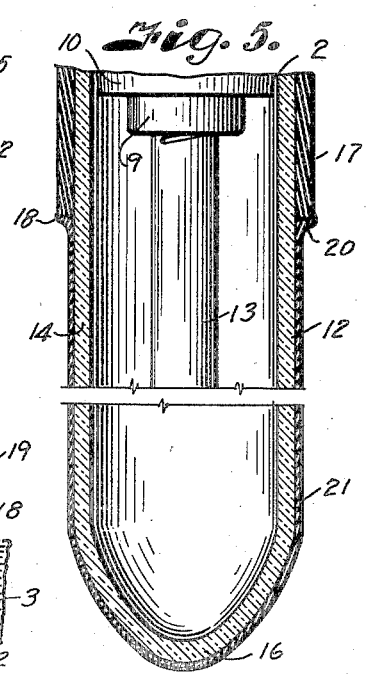
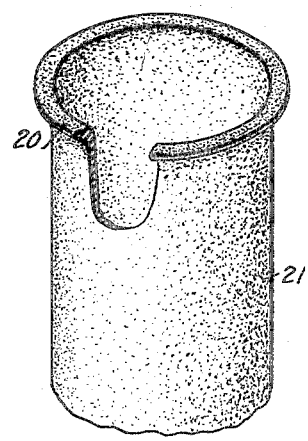
INVENTOR
Charles H. Fry
BY
Arthur LeBrown
ATTORNEY Patented Jan. 14, 1941

2,228,992

UNITED STATES PATENT OFFICE 2,228,992

METHOD OF PRODUCING BEADED ARTICLES FROM LIQUID LATEX

Charles H. Fry, North Kansas City, Mo., assignor to Dean Rubber Manufacturing Company, North Kansas City, Mo., a corporation of Missouri Application February 17, 1939, Serial No. 256,931

3 Claims. (Cl. 18—58)

This invention relates to a method of producing beaded articles from liquid latex.

In manufacture of this character a mold having shape of the article is dipped into a bath of liquid latex and withdrawn in such manner as to cause deposit of latex thereon in the form of a coating which, when dried and removed from the mold, produces the desired article. In latex articles having openings it is necessary to provide a reinforced edge or bead at the margin thereof to prevent tearing and for retaining the shape of the opening. It is the present practice to form the reinforced edge or bead by rolling a margin of the material while it is retained on the mold. Rolling is a difficult process and unless performed correctly results in an inferior product and distorted shape.

It is, therefore, a principal object of the present invention to provide a simple and inexpensive method for producing a reinforced edge upon articles of this character incidental to dipping and withdrawal of the mold.

A further object of the invention is to provide an article of better appearance and free of internal stresses so that the openings retain their imparted shape.

In accomplishing these and other objects of the invention, as hereinafter pointed out, I have provided an improved method and details of structure, the preferred form of which is illustrated in the accompanyinig drawings, wherein:

Fig. 3 is a sectional view through the dipping board and one of the molds showing immersion of the molds in a body of latex.

Fig. 4 is a detail view of one of the molds, partly in section, showing the step of withdrawing the mold from the body of latex and prior to formation of the reinforced edge by the coating which collects upon the bead forming element of the mold.

Fig. 5 is a similar detail view showing the completely formed edge.

Fig. 6 is a detail perspective view of a portion of the latex article after it has been stripped from the mold, a portion of the reinforced edge being broken away to show the cross-section thereof.

Figure 1:
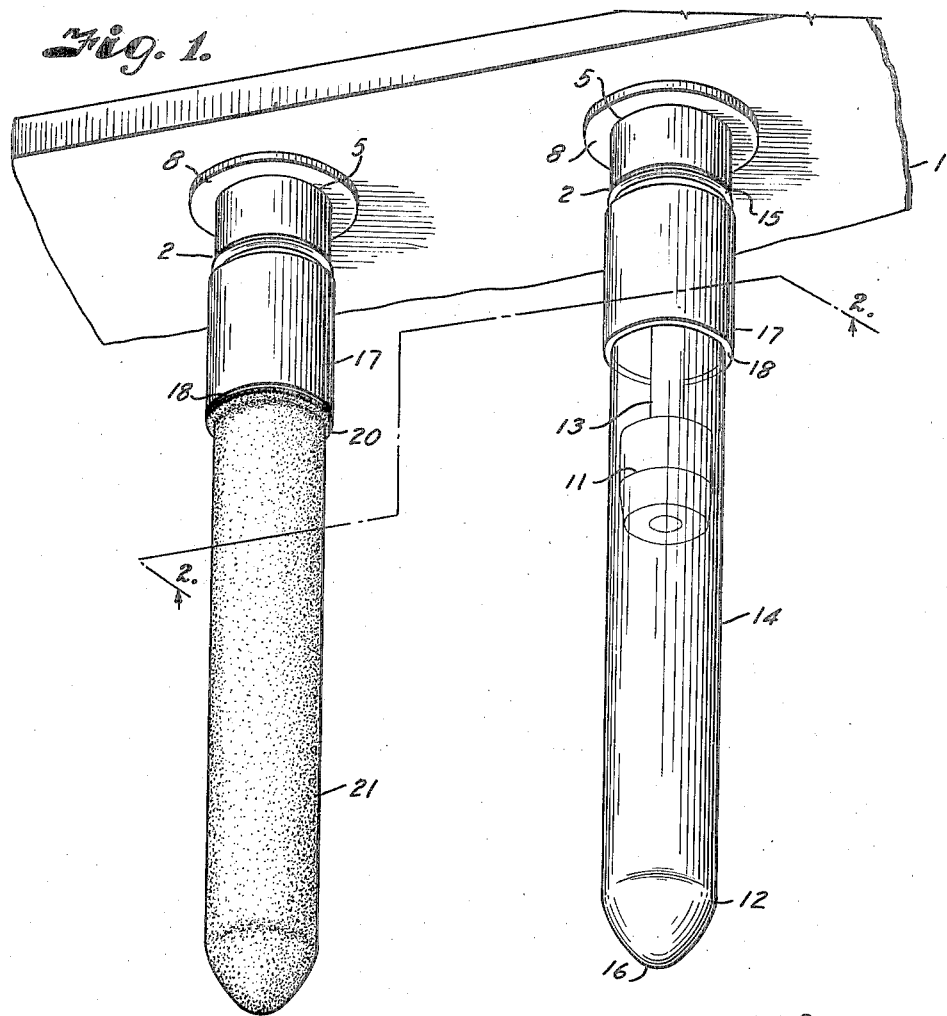
Fig. 1 is a perspective view of a portion of a conventional dipping board equipped with molds embodying the features of the present invention, and showing a latex article on one of the molds prior to stripping thereof.
Figure 2:
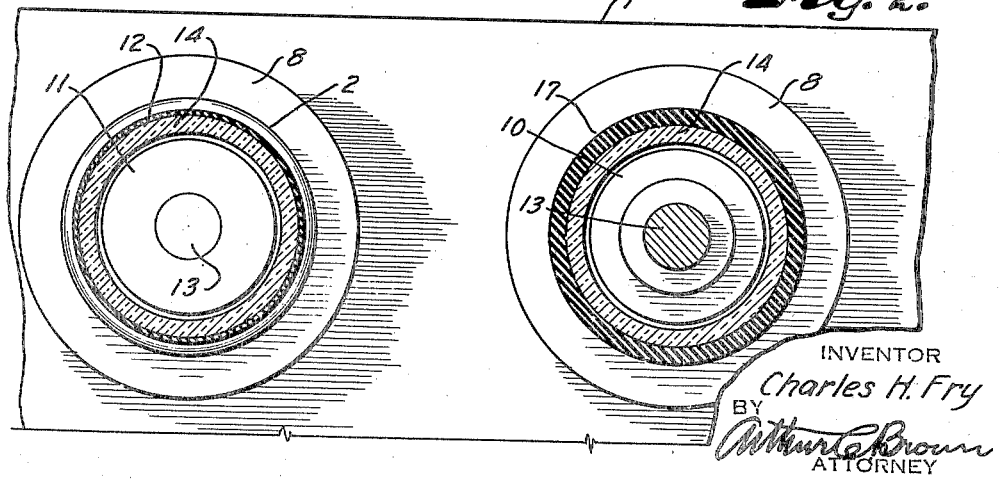
Fig. 2 is a horizontal section through the molds on the line 2—2 of Fig. 1.

Referring more in detail to the drawings:

I designates a conventional dipping board having a plurality of molds 2 which are adapted to be projected into and withdrawn from a body of latex 3 that is contained in a tank 4. The molds 2 include bases 5 having threaded portions 6 engaged within threaded openings 7 in the board. The bases 5 also have shoulders or flanges 8 which abut against the face of the board to cooperate with the threads in effecting secure anchorage of the molds. Extending axially from each base 5 is a reduced neck 9 carrying a cork or equivalent bushing 10 which cooperates with a similar bushing 11 to mount the body 12 of the mold, the bushing 11 being carried on the terminal end of a dowel rod 13 which projects from the neck 9.

The body 12 is shaped in accordance with the article to be produced, in the illustrated instance, a prophylactic article. The mold constitutes a cylindrical tube 14 having an open end 15 to pass the bushings which are pressed into the bore of the tube as shown in Fig. 3. The lower end of the tube is closed, as indicated at 16. The bodies of the molds are preferably formed of glass or similar material to which the latex adheres as a coating, but which is adapted to be readily stripped therefrom when the coating is dried.

Formed at the open end of the mold is a sleeve 17, having a wall thickness substantially corresponding to the width of the bead to be formed on the article, and which is of a length to collect a sufficient deposit of latex to provide the necessary material in producing a bead of required size. In forming the sleeves 17, the molds are dipped into latex substantially to the bases 5 and withdrawn to leave latex deposits upon the surfaces of the molds. This process is repeated a number of times until the combined coatings produce the required thickness of the sleeves 17. A molding surface of desired length is then formed by cutting the coatings circumferentially of the mold to provide a shoulder 18 which constitutes the upper edge of a latex article formed on the mold. The surplus coating is then cut into similar length sleeves which are stripped from the molds and applied to other forms. The sleeve elements of the molds are then treated to render the surfaces thereof so that liquid latex will not adhere thereto or remain attached while the latex is in a liquid state. I have found that such a surface is produced by chlorinating the latex. This is readily effected by immersing the molds with the sleeves in a standard chlorinating solution used in the processing of latex and well known in the art. Other types of sleeves may be used, such as stainless steel and materials to which the latex will not adhere while in liquid state.

In using the molds constructed and assembled as described, the molds are dipped into the body of latex to a point where the sleeves are partly immersed, as shown in Fig. 3. As the molds are slowly withdrawn, a coating of latex 19 is left upon the sleeves, but as the withdrawal proceeds these coatings flow downwardly around the shoulders 18 to coalesce with the latex coatings adhering to the glass in the form of reinforced edges or beads 20, as shown in Figs. 4 and 5. Withdrawal of the sleeves from the latex appears to produce a slight suction so that the latex flow from the sleeve is drawn under the shoulders 18. After withdrawal the coatings on the molds are treated in the conventional manner to effect curing thereof. When the articles 21 are stripped from the molds they have reinforced edges as shown in Fig. 6, which are of uniform shape and entirely free from internal stresses which ordinarily produce distortion of the articles as in the instance of improper rolling of beads as in conventional practice.

Attention is directed to the fact that the corners of the shoulders 18 are sharp so as to cut through any thin film of latex that may cling to the sides of the sleeves.

The size of the reinforcement may be regulated by the depth at which the sleeves are immersed in the latex, a greater or less amount collecting on the sleeves in accordance with the depth of immersion.

From the foregoing it is obvious that I have provided an extremely simple and inexpensive method of producing reinforced edges or beads on the open ends of articles formed from latex.

What I claim and desire to secure by Letters Patent is:

1. The method of making beaded articles from latex including, dipping a mold into a body of liquid latex, withdrawing the mold to effect coating of the mold with latex, causing a selected portion of the coating on the mold to adhere to the mold without appreciable back-flow of the coating during withdrawal of the mold, and causing an upper selected portion of the coating to back-flow completely onto the first-named selected portion incidental to withdrawal of the mold to form an increased thickness of the coating at the upper edge of said first-named portion.

2. The method of making beaded articles from latex including, dipping a mold having an annularly projecting shoulder into a body of liquid latex to a point above said shoulder, withdrawing the mold to effect coating of the mold with latex, causing the portion of the coating below said shoulder to adhere to the mold without appreciable back-flow incidental to withdrawal of the mold, and causing the portion of the coating above said shoulder to back-flow and collect under said shoulder to form a thickened ring of latex below said shoulder.

3. The method of making beaded articles of latex including, dipping a mold provided with an offset surface slightly adherent to liquid latex and a lower more adherent surface into a body of liquid latex to a point on the slightly adherent surface, withdrawing the mold from the body of latex to effect coating of the mold and causing the latex on the mold above the offset to back-flow from the slightly adherent surface and collect under said offset to form a thickened ring, and effecting coalescence of said thickened ring with the latex coating on said more adherent surface.

CHARLES H. FRY.